United States Patent
Zigliotto

(10) Patent No.: US 6,419,417 B1
(45) Date of Patent: Jul. 16, 2002

(54) SHEATH CLAMP FOR A WELDING TORCH CABLE

(75) Inventor: Giuseppe Zigliotto, Longara Vicenza (IT)

(73) Assignee: Trafimet, S.P.A., Vicenza (IT)

( * ) Notice: Subject to any disclaimer, the term of this patent is extended or adjusted under 35 U.S.C. 154(b) by 0 days.

(21) Appl. No.: 09/496,427

(22) Filed: Feb. 2, 2000

(30) Foreign Application Priority Data

Feb. 3, 1999 (IT) ......................................... VI990009 U
Dec. 10, 1999 (IT) ......................................... VI990107 U

(51) Int. Cl.⁷ .......................... F16L 33/24; B23K 9/00; F16C 1/10
(52) U.S. Cl. ........................ 403/279; 285/255; 285/249; 403/165; 219/137.63; 74/502.4
(58) Field of Search ................................. 285/255, 249; 219/137.31, 137.63; 74/502.4; 403/279, 165

(56) References Cited

U.S. PATENT DOCUMENTS

| | | | | |
|---|---|---|---|---|
| 1,508,713 A | * | 9/1924 | Noble | 219/137.2 X |
| 1,876,731 A | * | 9/1932 | Neate | 403/291 X |
| 4,278,279 A | * | 7/1981 | Zimmerman | 285/255 |
| 4,321,840 A | * | 3/1982 | Kalamon | 74/502.4 |
| 4,544,827 A | | 10/1985 | Cusick, III | |
| 4,577,894 A | * | 3/1986 | Wake | 285/255 X |
| 4,695,702 A | | 9/1987 | Gartland | |
| 4,946,200 A | * | 8/1990 | Blenkush et al. | 285/255 X |
| 5,440,100 A | * | 8/1995 | Stuart et al. | 219/137.31 |
| 5,498,043 A | * | 3/1996 | Goldenberg | 285/255 X |
| 5,704,255 A | * | 1/1998 | Graham | 74/502.4 |
| 5,862,710 A | * | 1/1999 | Koenig | 74/502.4 |
| 5,965,045 A | * | 10/1999 | Zigliotto | 219/137.31 |

FOREIGN PATENT DOCUMENTS

| | | | | |
|---|---|---|---|---|
| CA | 455932 A | * | 4/1949 | 285/255 |
| DE | 19631090 | | 2/1998 | |
| FR | 270019 | | 11/1995 | |
| GB | 6566 A | * | 1/1905 | 285/255 |

* cited by examiner

Primary Examiner—Lynne H. Browne
Assistant Examiner—Ernesto Garcia
(74) Attorney, Agent, or Firm—Vorys, Sater, Seymour and Pease LLP

(57) ABSTRACT

A sheath clamp for a welding torch, comprising a sleeve (5) having a spherical head (3) adapted to be inserted into a seat in the torch and a flange axially spaced from the head, with a collar (9) slidably mounted on the sleeve (5), and means for urging the collar (9) along the axis of the sleeve in order to clamp a sheath (2), fitted over the sleeve (5), against the flange (4). Preferably the collar (9) is provided with at least one inwardly protruding tooth (10), preferably two inner opposed teeth, and the sleeve has a reduced diameter portion between the flange (4) and the spherical head (3), which is bounded by inclined raised walls (7) which can be engaged by the tooth (10) of the collar (9), so that rotation of the ring causes an axial displacement of the collar along the sleeve (5).

5 Claims, 3 Drawing Sheets

SHEATH CLAMP FOR A WELDING TORCH CABLE

BACKGROUND OF THE INVENTION

1. Field of the Invention

The present invention relates to a sheath clamp in particular for a welding torch having a spherical or ball joint for connection to an integrated supply cable, characterised in that it is provided with quick connection means for clamping a cable sheath.

In particular, the invention provides quick fastening means which ensure the clamping of the integrated cable or, more precisely, of its sheath, avoiding any possible unfastening and detaching, thus making the welding tool easier and handy to use.

2. Brief Description of the Prior Art

Several solutions and accessories for welding torches are already known in the welding field; said torches are connected to a current generator by means of a power supply cable.

Said supply cable, during the operation of the tool, connects the handle of the welding torch to an attachment or feed connector on the generator, in order to provide the tool with the current, the control signals, the gas and whatever is necessary for its operation.

The integrated supply cable or feeder cable usually comprises several components protected by a sheath; for instance, a power cable for the welding current, one or more cables bringing the signals from the torch to the generator, a hose for supplying a gas and, if required, hoses for a cooling fluid.

Since the bundle of the integrated cable is quite thick, quite bulky and not very flexible and, as a consequence, does not readily follow the movements of the welding torch, the use of a spherical joint has already been proposed, which makes the torch free to move with respect to the cable to which it is connected.

On one hand such a spherical joint has solved the problem arising from the torch stiffness with respect to the supply cable, but on the other hand it has enhanced some difficulties relating to the connection and clamping of the sheath.

In accordance with a first known solution, bands locked by means of screws are used, in order to fasten the sheath to the sleeve of the spherical joint.

The bands, however, are difficult to apply, due to the fact that fastening can only be achieved by using tools, such as screwdrivers or the like, and moreover there is a difficulty in handling the torch, because of the overall dimensions of the projecting parts of the band.

SUMMARY OF THE INVENTION

The object of the invention is to remedy the drawbacks due to the poor effectiveness of the known clamping means used in spherical joints to connect the welding torch and the integrated cable, by providing a new fastening device, which comprises an annular coupling of the collar-flange type, as well as means for making the collar shift along the sleeve for clamping the sheath. The clamping means of the invention comprises a cylindrical body which, at one end, is provided with a spherical joint for engaging the welding torch handle and, at the other end, is provided with a flange, engaged by a collar or ring nut provided with inner teeth which cooperate with a slot in the cylindrical body to clamp the sheath. According to a first embodiment of the invention, one or more pins are provided which are integral with the ring nut and which engage an inclined wall on the sleeve, to cause the shifting of the collar.

According to a second embodiment of the invention, a thread is provided on the interior of the collar, that engages a corresponding thread on the sleeve.

BRIEF DESCRIPTION OF THE DRAWINGS

In the specification reference is made to the enclosed drawings in which.

DETAILED DESCRIPTION OF THE INVENTION AND PREFERRED EMBODIMENTS

Figure 4:
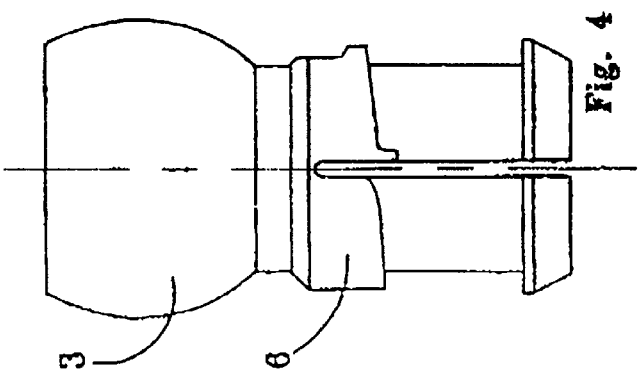
FIG. 4 is a schematic view of the joint in a second side view.
Figure 2:
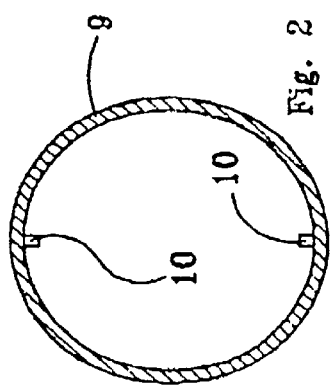
FIG. 2 shows a sectional view of the collar, showing the inner teeth.
Figure 3:
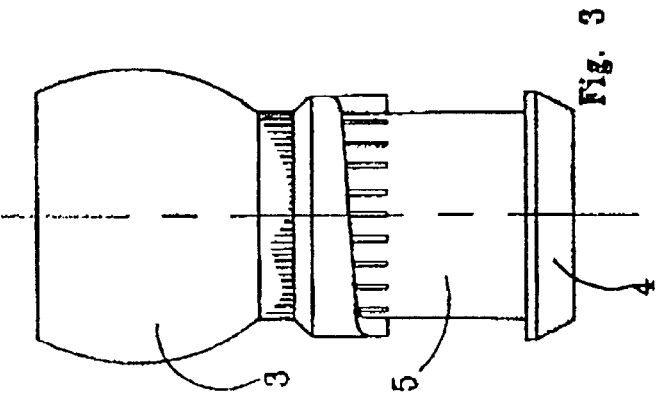
FIG. 3 is a schematic view of the joint in a first side view.
Figure 1:
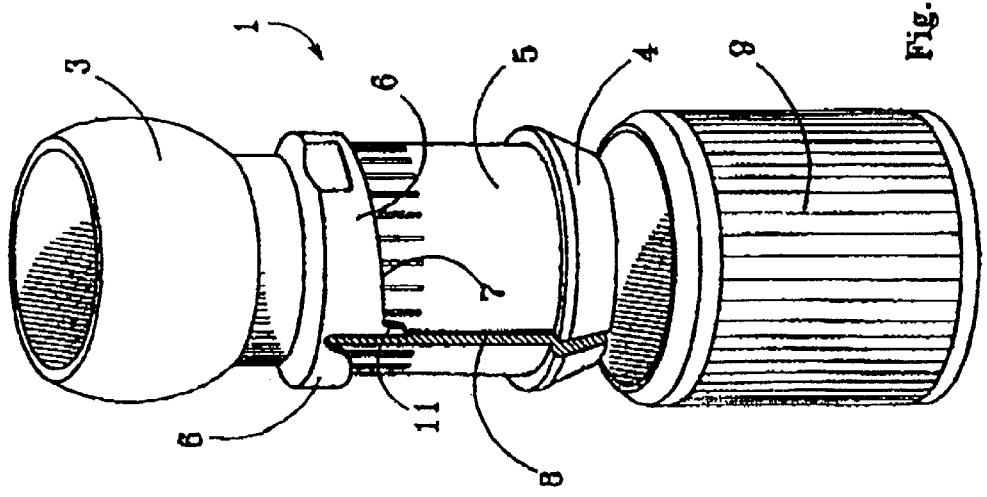
FIG. 1 is an exploded view of the joint in accordance with the invention shown as a whole.
Figure 5:
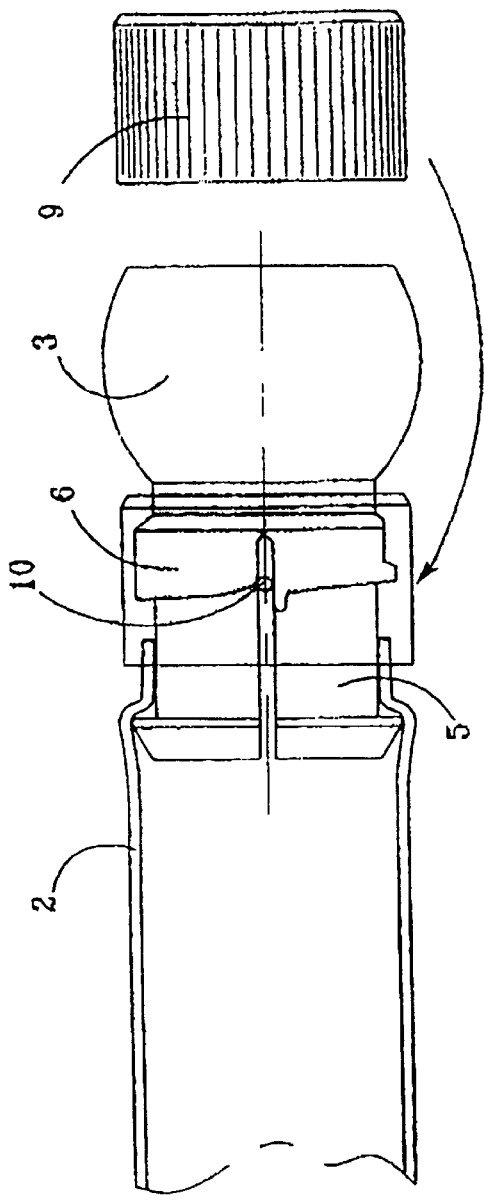
FIG. 5 schematically shows the joint in accordance with the invention, during the insertion of a sheath.
Figure 6:
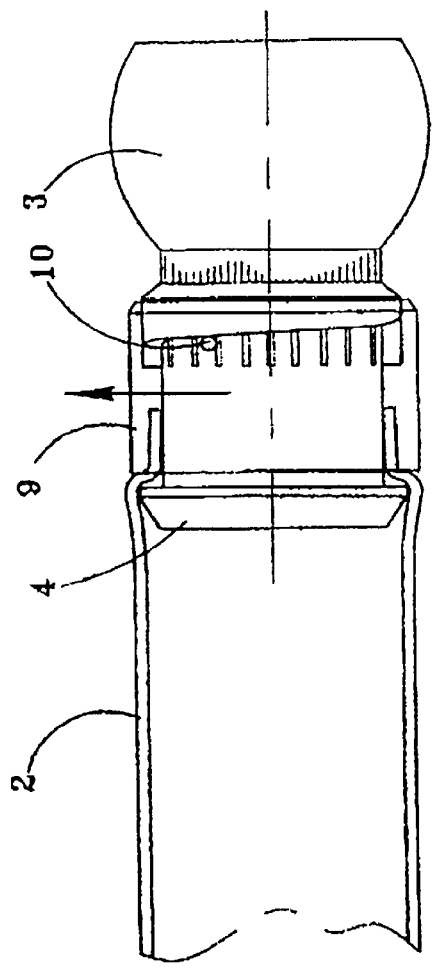
FIG. 6 is a view of the joint of the invention, after the insertion of a sheath.

The invention relates to a joint for welding torches or the like comprising a sleeve and a collar or ring nut sliding along this sleeve, said collar being provided with at least an inner protruding tooth, preferably two inner opposite teeth, and wherein an inclined wall is provided on the outer surface of the sleeve, said teeth engaging said inclined wall so that, upon rotation of the collar, it shifts along the sleeve, clamping the sheath. Further advantages and features of the invention can be better understood from the following description of a non-restrictive embodiment.

This application claims the benefit of the priority of Italian Patent Application No. VI99U 000009, filed Feb. 03, 1999, and Italian Patent Application No. VI99U 000107, filed Dec. 09,1999, the disclosures of both of which are incorporated herein by reference.

With reference to the enclosed drawings, numeral 1 indicates as a whole a joint for connecting a feeder cable to the handle of a welding torch, not shown since it is of a known type. Numeral 2 indicates the sheath of the feeder cable. The joint 1, preferably made of plastic materials, comprises a spherical head 3 and a cylindrical hollow body or sleeve 5, which ends with a flange edge 4, chamfered to make easier the application of the sheath 2.

The invention is characterized in that a section of reduced diameter is provided on the outer wall of the sleeve 5, in an area comprised between the spherical head and the flange 4.

Said reduced diameter portion is delimited by a raised portion 6, defining a wall 7 which is inclined with respect to a plane orthogonal to the axis of the sleeve.

Two axial slots 8, opposite to each other, are provided on the sleeve 5 of the joint, and divide the sleeve itself into two symmetrical parts, facing each other.

The inclined walls 7 are also symmetrical.

The described parts are engaged by a collar 9, which is cylindrical, hollow, and is provided with a pair of inner teeth 10 facing each other.

The collar 9 is the clamping element for the sheath 2 of the cable, said sheath being fitted onto the sleeve, surrounding the annular flange 4.

The clamping of the sheath 2 is obtained by rotating the collar 9 to a certain extent, so that the engagement of the teeth 10 with the inclined walls 7 of the raised portion 6 causes a thrust of the edge of the collar against the flange 4.

The collar 9 clamps the sheath against the flange 4, without the need of further operations.

It is to be noted that in order to lock the sheath it is sufficient to rotate the collar about a quarter-turn or half a turn.

Advantageously stop means, such as teeth 11, are provided at the end of each inclined wall 7 to limit the rotation of the collar 9 and its thrust against the flange 4.

Figure 7:
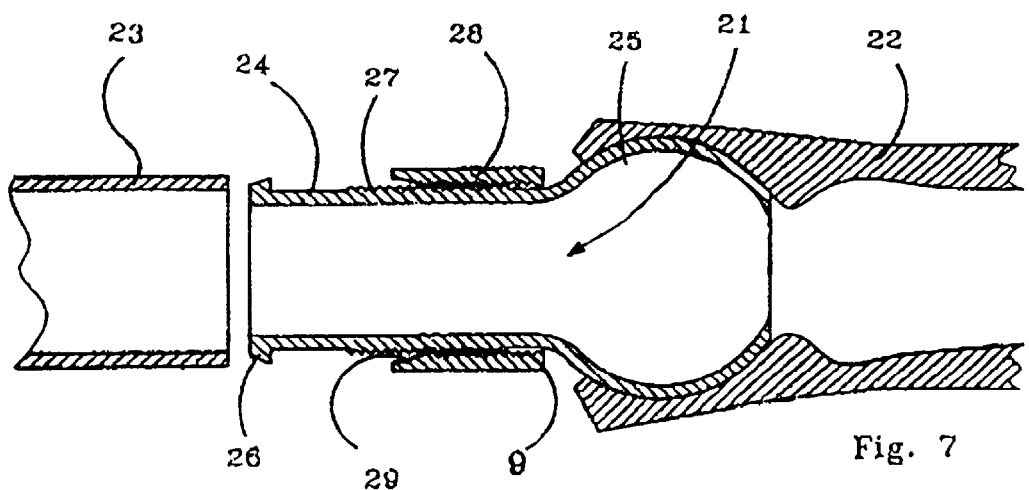
FIG. 7 schematically shows the joint in accordance with a further embodiment of the invention, in a vertical section with the sheath of the supply cable before it is fitted on the sleeve.
Figure 8:
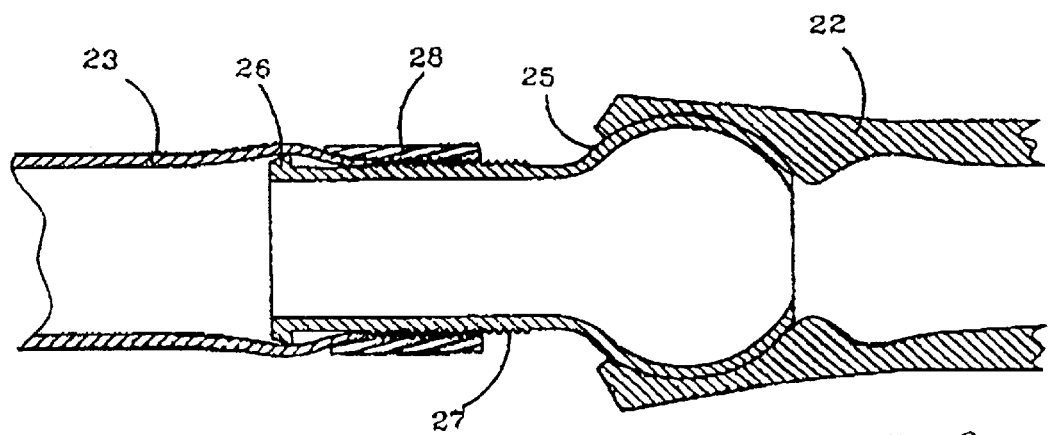
FIG. 8 shows a schematic view of the joint of FIG. 7, after the sheath has been connected.

FIGS. 7 and 8 show a different embodiment of the invention.

In these figures, numeral 21 indicates a joint or connecting element for a handle 22 of a welding torch to which a supply cable with a sheath 23 must be fitted.

The joint 21 comprises a cylindrical sleeve 24 with a substantially circular section, and a spherical head 25 to be inserted into a corresponding spherical seat provided in the handle of the torch.

A flange 26 is provided at one end of the sleeve 24, and an external thread 27 is provided on the sleeve body.

A collar 28 is mounted on the sleeve 24 and is provided with an internal thread having the same pitch as the thread 27 of the sleeve, so that the collar or ring nut can shift with a longitudinal movement along the axis of the sleeve 24 when the collar is rotated.

Finally, the collar 28 itself is provided with a chamfer 29 at its end facing the flange 26, which clamps the sheath of the feeding cable.

It is sufficient to insert the sheath over the sleeve 24, in order to attach the supply cable.

Thereafter, the collar can be rotated in such a way that, moving towards the outside flange 26, it can abut the edge of the sheath, which is so pressed against the flange 26.

As it will be apparent from the foregoing, the invention permits clamping the sheath on the sleeve without the use of any tool, avoiding the presence of cuff elements, such as bands, which could damage the sheath.

Those skilled in the art could provide several modifications to what has been described and shown as a non restrictive example and some parts could be changed by any other technical equivalents, all of which fall within the scope of the present invention as defined in the appended claims.

I claim:

1. A sheath clamp for a welding torch cable, comprising a sleeve (5) having a spherical head (3) adapted to be inserted into a seat in a welding torch and a flange (4) spaced axially from said spherical head (3), a collar (9) slidably mounted on said sleeve (5) between said spherical head (3) and said flange (4), and means for urging said collar (9) axially along the sleeve, so that a sheath (2), fitted onto the sleeve (5), is clamped against the flange (4), said urging means comprising at least one inwardly projecting tooth (10), on said collar (a) reduced diameter portion on a surface of the sleeve (5), between said flange (4) and said spherical head (3), and at least one axially inclined radial wall (7) bonding said reduced diameter portion and engagable by the tooth (10) of the collar (9), which causes an axial displacement of the collar (9) along the sleeve when the collar (9) is rotated.

2. A sheath clamp according to claim 1 wherein said collar (9) is provided with two oppositely positioned teeth and said sleeve (5) is provided with a pair of inclined walls (7).

3. A sheath clamp for a welding torch in accordance with claim 2, wherein two opposite slots (8) are provided in said sleeve (5), said slots symmetrically dividing said sleeve (5) and said inclined walls (7).

4. A sheath clamp for a welding torch in accordance with claim 1, wherein the sheath (2) is clamped by rotating said collar (9), whereby action of the teeth (10) against the inclined walls (7) thrusts an edge of the collar (9) toward the flange (4).

5. A method of clamping a sheath of a welding torch cable comprising, providing a cylindrical sleeve (5) having a spherical head (3) adapted to be inserted into a seat in a welding torch and a flange (4) spaced axially from said spherical head (3), a collar (9) slidably mounted on said sleeve (5) between said spherical head (3) and said flange (4), and means for urging said collar (9) axially along the sleeve when said collar (9) is rotated, fitting an end of the sheath of the welding torch cable over said flange (4) for a distance sufficient to provide a free end between said flange and said collar that can be clamped between said collar and said flange or between said collar and said sleeve, and rotating said collar to clamp said sheath between said collar and said flange or said sleeve.

* * * * *